United States Patent [19]

Toriumi et al.

[11] 4,408,732
[45] Oct. 11, 1983

[54] STRIP FILM HANDLING DEVICE

[75] Inventors: Shiro Toriumi, Zama; Kenjiro Ishii, Yokohama; Seiichi Yamagishi, Machida, all of Japan

[73] Assignee: Minolta Camera Kabushiki Kaisha, Osaka, Japan

[21] Appl. No.: 253,461

[22] Filed: Apr. 13, 1981

[30] Foreign Application Priority Data

| Apr. 16, 1980 | [JP] | Japan | 55-51384[U] |
| Apr. 18, 1980 | [JP] | Japan | 55-52184 |
| May 21, 1980 | [JP] | Japan | 55-68238 |
| Nov. 19, 1980 | [JP] | Japan | 55-166373 |

[51] Int. Cl.³ .................... G03B 1/04; G11B 15/32
[52] U.S. Cl. .................... 242/192; 242/195
[58] Field of Search ........ 242/192, 197, 200, 208–210, 242/195, 71.9; 352/158; 353/26; 226/188, 190

[56] References Cited

U.S. PATENT DOCUMENTS

| 3,208,682 | 9/1965 | Pastor et al. | |
| 3,467,340 | 9/1969 | Rosenburgh . | |
| 3,599,897 | 8/1971 | Wangerin . | |
| 3,666,206 | 5/1972 | Pammer et al. | 242/192 |
| 3,704,836 | 12/1972 | Yamada | 242/192 |
| 3,706,488 | 12/1972 | Masetta | 353/26 |
| 3,750,976 | 8/1973 | Bundschuh et al. | 242/192 |
| 4,193,560 | 3/1980 | Diegel | 242/71.9 |

*Primary Examiner*—Leonard D. Christian
*Attorney, Agent, or Firm*—Wolder, Gross & Yavner

[57] ABSTRACT

A device for use in microfilms readers or the like for handling strip films of different widths contained in cartridges of different types comprises means for driving the reel of a cartridge loaded in place, means movable into a film feeding outlet of the cartridge to frictionally contact the surface of the strip film for feeding the film from the cartridge, means for detecting marks on strip films of varying widths, and take-up means including reel flanges settable for winding up strip films of different widths. The device is usable for cartridges adapted for different systems or produced by different makers.

24 Claims, 22 Drawing Figures

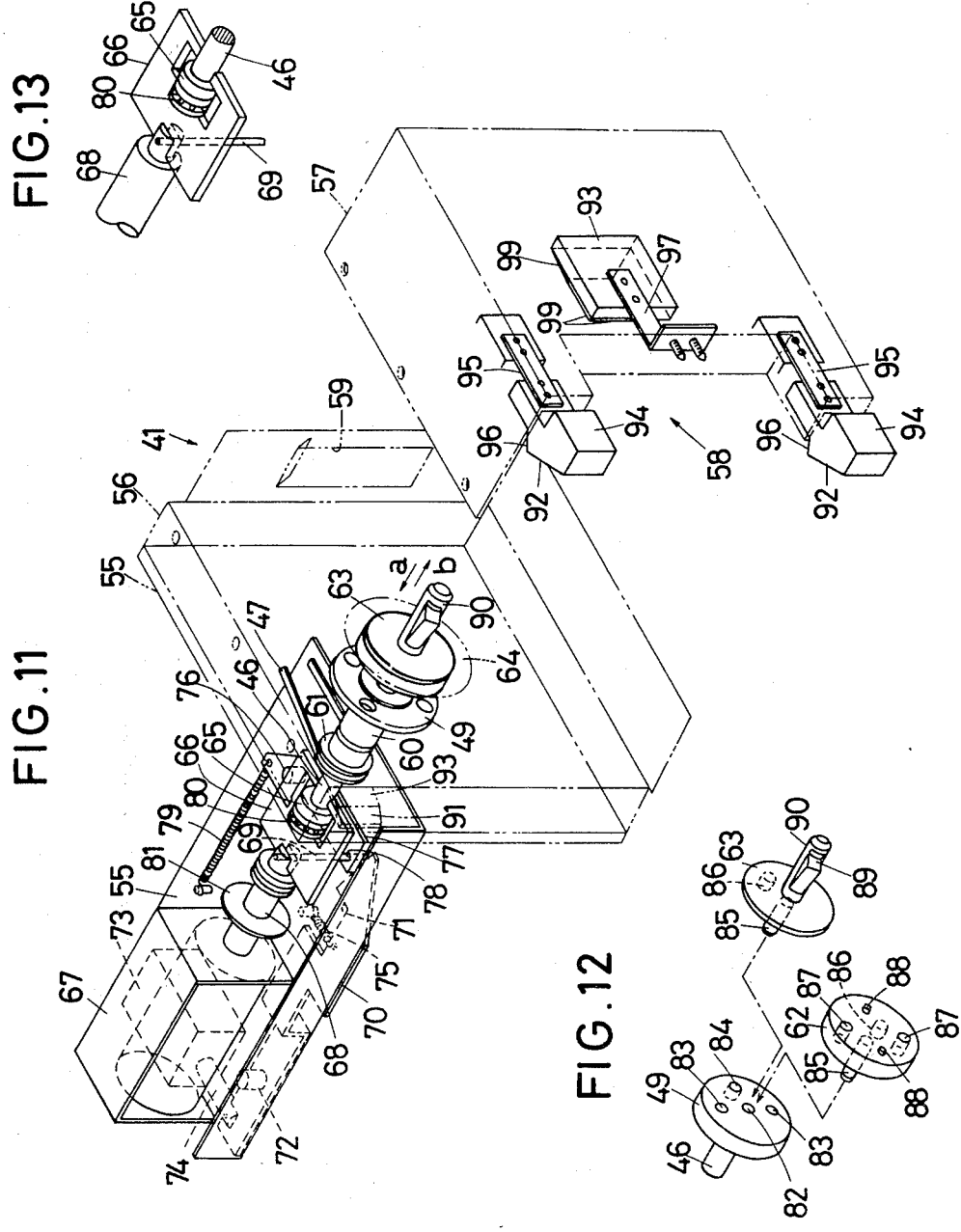

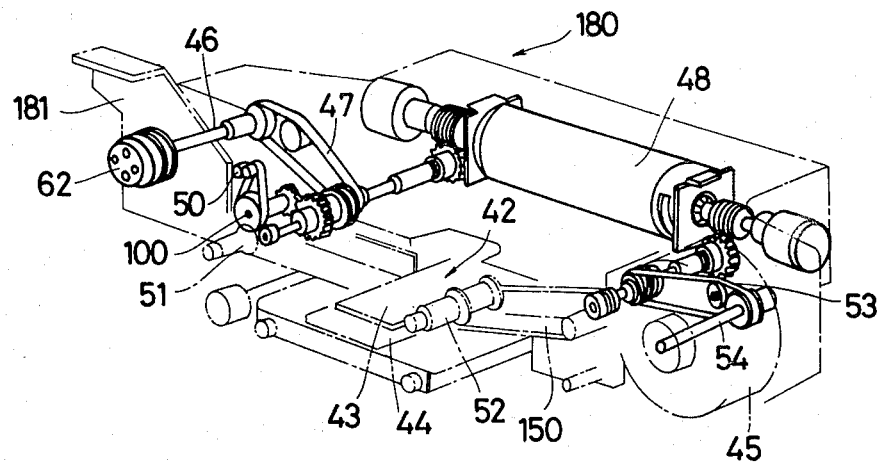
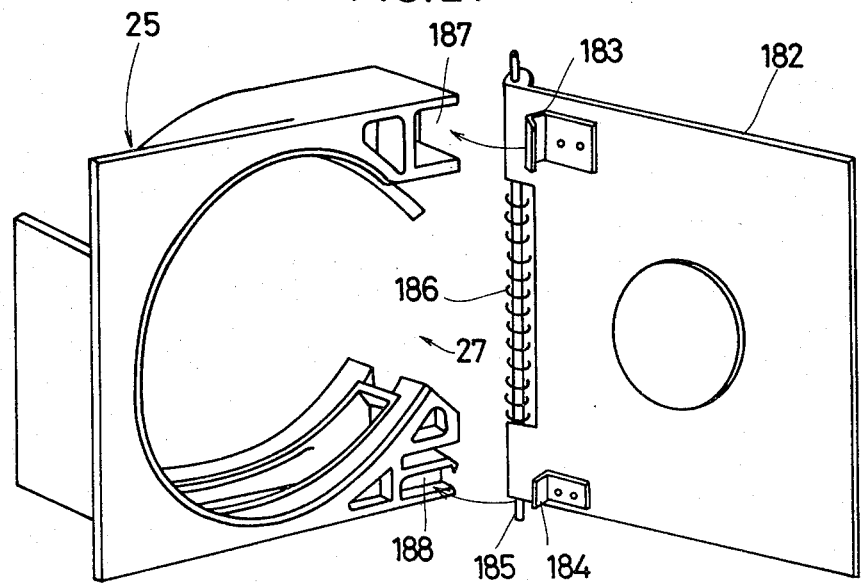

STRIP FILM HANDLING DEVICE

BACKGROUND OF THE INVENTION

The present invention relates to a strip film handling device for microfilm readers and the like, and more particularly to a strip film handling device for a microfilm reader or the like which uses a roll film wound on a reel and placed in a cartridge, the device being universally usable for films of the type having a stiff lead tape at the leading end of the film and also for films having no lead tape.

Such devices are disclosed, for example, in S. L. Pastor et al. U.S. Pat. No. 3,208,682, N. J. Rosenburgh U.S. Pat. No. 3,467,340 and E. O. Wangerin U.S. Pat. No. 3,599,897.

FIGS. 1 to 3 show a device for use with a strip film comprising a film main portion 1 and a lead tape 2 attached to the leading end of the main portion 1 and having a larger width and greater stiffness than the main portion 1. The film is accommodated in a cartridge 5 with its main portion 1 wound on a reel 3 inside flanges 4 and the lead tape 2 wound around the flanges 4. The cartridge 5 is formed in a shoulder portion thereof with an opening 6 having therein a roller 7 which is movable in a direction as indicated by an arrow in FIG. 3 to nip the lead tape 2 between the roller 7 and the outer peripheries of the flanges 4. By virtue of the stiffness of the lead tape 2, the free end of the tape 2 is led to a film outlet 8 and delivered to a guide 9 by the rotation of the roller 7 in the direction of the arrow. Typical of such systems is disclosed in the above-mentioned U.S. Pat. No. 3,208,682. While the lead tape 2 is thus withdrawn by the roller 7 in frictional contact therewith, the strip film must be taken up on the reel 3 by driving the reel 3. For this purpose, the reel 3 is centrally provided with a connector 10 having embedded therein attractable pieces 11 which are engageable by magnet pieces embedded in an engaging portion of an unillustrated drive shaft. Pins projecting from the drive shaft engaging portion are engageable in bores in the connector 10 to couple the connector 10 to the drive shaft.

FIG. 4 shows another cartridge 15 for a strip film having no lead tape at its leading end. The cartridge 15 is formed in its bottom with a film drive aperture 16 for feeding the film. A device for the cartridge 15 for handling the film has a film drive roller 20 shown in FIG. 5 and insertable into the aperture 16. In direct rolling contact with the roll film 1, the roller 20 frictionally drives the film for feeding. The cartridge 15 has a film outlet 18 provided with a separating roller 21 which is rotatable as indicated by an arrow. The leading end of the strip film 1, when reaching the outlet 18, is separated from the roll by the roller 21 and is withdrawn. The reel 17 for the film has a square bore 19 for receiving an unillustrated winding drive shaft. The drive roller 20, which is movable into or out of the aperture 16 by a solenoid 22, is driven by a drive shaft 23 through a belt or the like.

Since the film is not provided with any lead tape and therefore is not as stiff as the lead tape, the leading end of the film must be separated by some means, such as the above-mentioned separating roller, from the roll portion, but the film has the advantage that the lead tape can be dispensed with. Although the system for such film is thus advantageous over the one shown in FIGS. 1 to 3, the system is disadvantageous in other respects. The device shown in FIG. 4 is known as the easy loading system cartridge of Minnesota Mining & Manufacturing Co., U.S.

Further as disclosed in U.S. Pat. Nos. 3,208,682 and 3,599,897, Eastman Kodak Co., U.S. has proposed Ectamate systems for loading a specifically designed machine with a cartridge.

Basically these system are similar to the one shown in FIGS. 4 and 5. With U.S. Pat. No. 3,208,682, the flanges of a reel carrying a strip film are pressed on from the opposite sides to warp the leading end of the film widthwise and to thereby cause the flexible film to exhibit some stiffness so that the leading end can be separated from the roll portion. The system of U.S. Pat. No. 3,599,897 has a film outlet provided with a separating member in the form of a scraper.

Since the cartridge is adapted for use with specially designed machines with these systems, the cartridge is simpler than those of the two systems of Minnesota Mining & Manufacturing Co. described above.

FIG. 6 shows such a cartridge 25 integrally molded from plastics in a C-shaped piece and flexible at the back portion 26 of the C-shaped piece. The cartridge has a film outlet 27 at the open portion of the C shape and a bottom aperture 28 for retractably providing a film drive roller, such as the one shown in FIG. 5. A strip film wound on a reel can be placed into the cartridge 25 when the open portion 27 is forcibly enlarged upward and downward to diametrically enlarge the reel accommodating portion. When the reel is placed in position, the side flanges of the reel engage the opposite sides of a circumferential projection 29 on the inner periphery of the cartridge 25, rendering the reel rotatable by being guided by the projection 29.

As will be apparent from the foregoing description, the conventional film handling devices described, i.e. the system shown in FIG. 2 and the easy loading system, share nothing in common in respect of the film withdrawing or feeding method and each require a specific feeding mechanism. Further with Ectamate systems for which special machines are used, there are limitations on the films usable, or a specified machine must be prepared for a particular system, hence inconvenient.

Further since the widths of strip films still remain to be fully standardized, the film width differs slightly from maker to maker. Accordingly a cartridge containing a microfilm of one company is sometimes unusable for a retrieving device (for microfilm readers or the like) of another company because the flange-to-flange distance of a reel is set for the specified retrieving device. Thus there are serious limitations on the universal use of retrieving devices and cartridges.

Further there are automatic retrieval systems which are adapted to detect a mark on an edge portion of strip films. Such systems are not satisfactorily usable unless the detecting member is located in conformity with the position where the mark passes. However, the mark bearing position also varies slightly from maker to maker or from system to system.

On the other hand, FIGS. 2, 4 and 6 show that the film outlets of the cartridges for various systems are located substantially at the same position.

SUMMARY OF THE INVENTION

An object of the present invention is to provide a strip film handling device which is usable for cartridges of various conventional systems although the cartridges differ from maker to maker or from system to system, by taking advantage of the fact that the film outlets, which are in the form of a relatively large opening, are located substantially at the same position as mentioned above.

Another object of the invention is to provide a device which is adapted to properly feed a strip film from a cartridge irrespective of whether or not the cartridge has a lead portion, by providing a feeding frictional drive member in rolling contact with the strip film in the form of a roll and exposed at a film feeding outlet of the cartridge.

When the device of this invention is used for a cartridge containing a strip film wound on a reel and having no lead portion, a stiff lead tape of the same width as the film is connected to the film.

Another object of the invention is to provide drive means which is adapted to drive the real in a cartridge and which comprises an engaging member engageable with the reel and a drive transmitting assembly for advancing or retracting the member axially thereof so that the cartridge can be removably inserted into place in a direction perpendicular to the axis of the drive means when the cartridge is fixedly loaded in place.

Another object of the invention is to provide detecting means the position of which is adjustable for retrieving film marks which differ from maker to maker so as to assure automatic retrieval with ease and accuracy.

Another object of the invention is to provide a take-up reel for winding up the strip film withdrawn from a cartridge, the reel having a variable flange-to-flange distance and thereby made usable for strip films of different widths.

Still another object of the invention is to provide means for feeding a strip film from a cartridge which means has a separating member for guiding the leading end of the strip film to render the film smoothly feedable.

Other objects and features of the invention will become apparent from the following description.

BRIEF DESCRIPTION OF THE DRAWINGS

FIG. 11 is a perspective view showing a mechanism for rotatingly driving a reel;

FIG. 12 shows the relation between a drive shaft of the same mechanism and engaging means engageable with the reel;

FIG. 13 shows a coupling mechanism for advancing or retracting the drive shaft axially thereof;

FIG. 20 is a perspective view showing a drive mechanism therefor;

FIG. 21 is a perspective view showing a cartridge holding assembly; and

DESCRIPTION OF THE PREFERRED EMBODIMENTS

Figure 7:
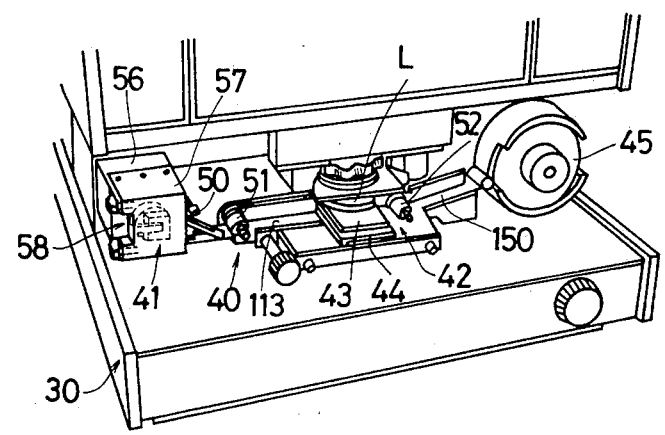
FIG. 7 is a perspective view showing a strip film handling device embodying the invention and installed in a microfilm reader.
Figure 8:
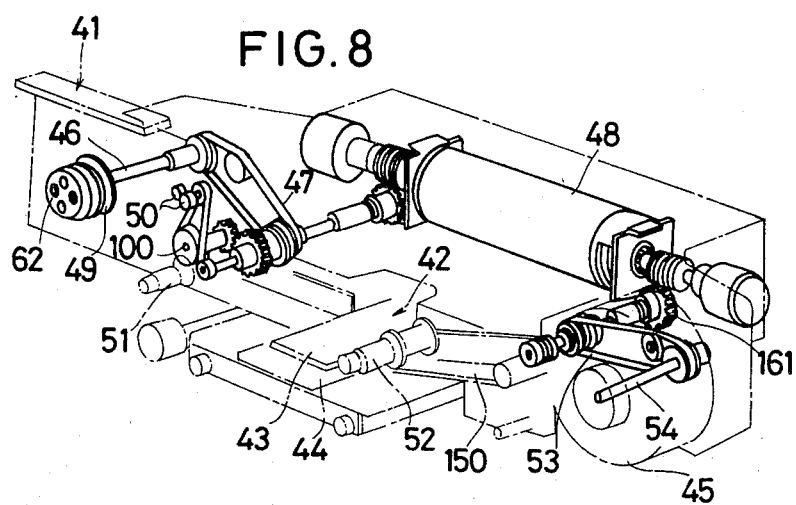
FIG. 8 is a perspective view showing a drive system therefor.

FIG. 7 is a view generally showing a strip film handling device 40 mounted on a microfilm reader 30. FIG. 8 shows a drive mechanism for the device.

Figure 2:
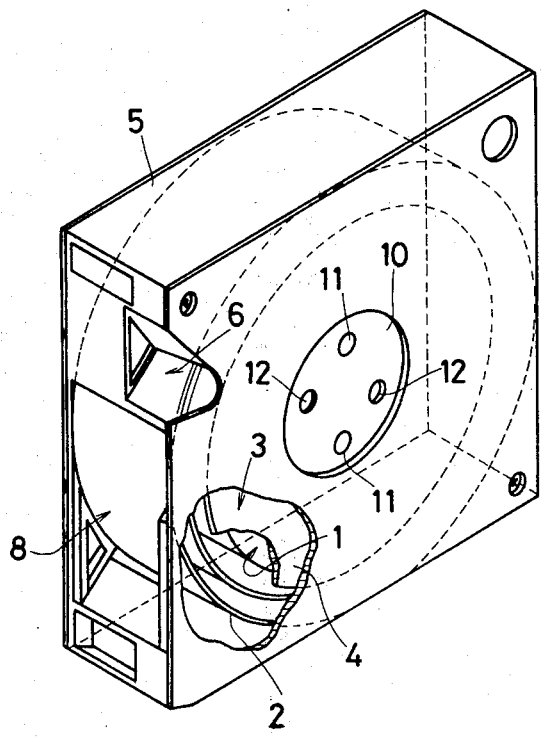
FIG. 2 is a perspective view showing a cartridge which has heretofore been used.
Figure 3:
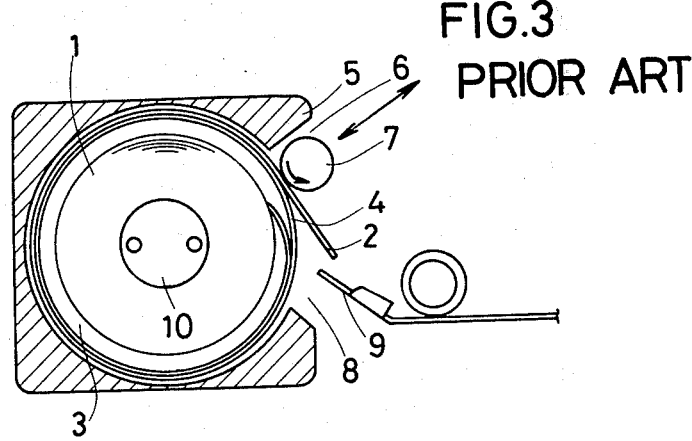
FIG. 3 shows a system for feeding the film from the cartridge.
Figure 4:
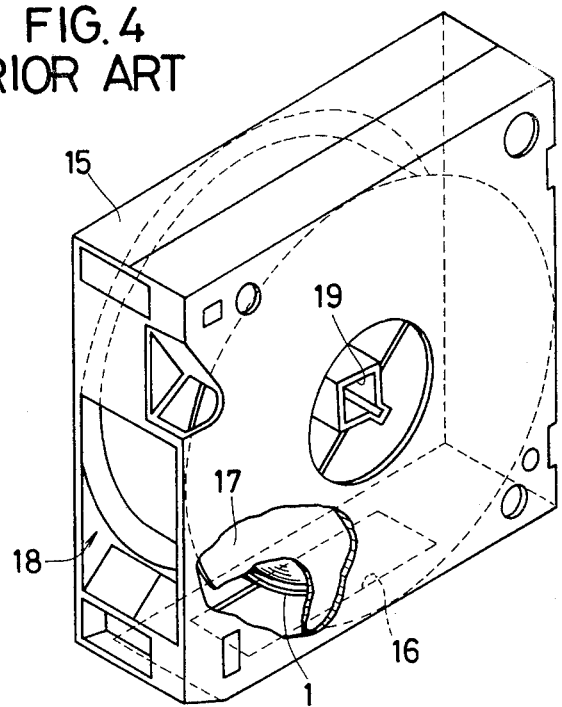
FIG. 4 is a perspective view showing another conventional cartridge.
Figure 5:
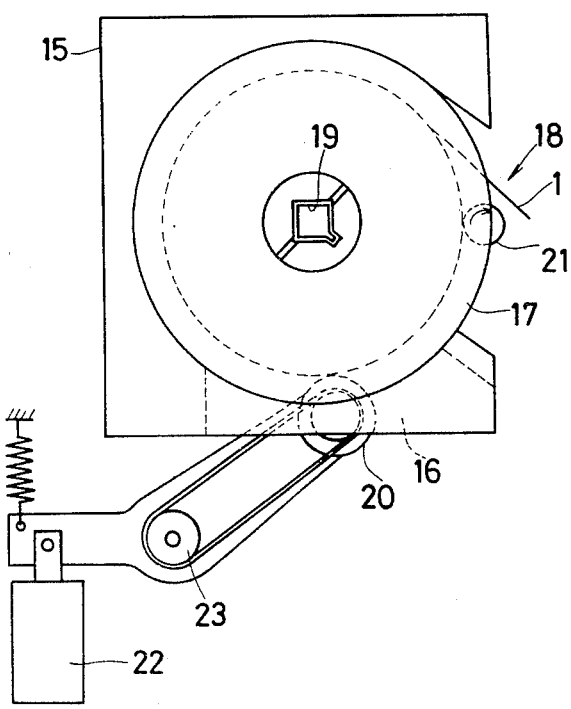
FIG. 5 shows a system for feeding the film from the cartridge of FIG. 4.
Figure 6:
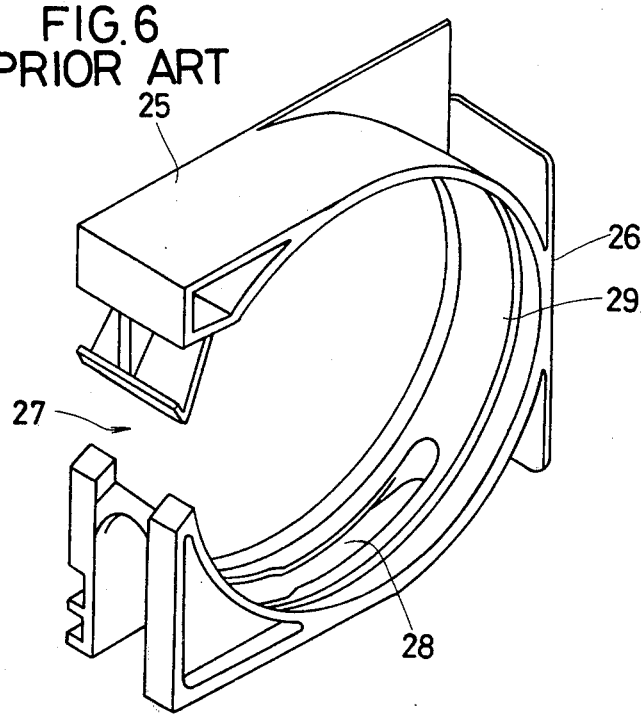
FIG. 6 is a perspective view showing another conventional cartridge.

The device 40 includes a box-shaped cartride mount 41 loaded with a cartridge 5, 15 or 25 as shown in FIG. 2, 4 or 6. A strip film 1 (see FIG. 2) paid off from the cartridge is passed between glass plates 43 and 44 provided at an illuminating station 42 and is wound on a take-up reel 45 on the right side. Alternatively the film 1 wound on the reel 45 is unwound and taken up on the reel in the cartridge. By the winding or unwinding, the desired frame of the film 1 is set in the illuminating station 42 for projection onto a screen or for printing.

The cartridge mount 41 has a drive shaft 46 which is driven by a motor 48 through a belt 47, etc. The shaft 46 carries a flange 49 for detachably holding an engaging member which is engageable with the connector of the reel in the cartridge 5, 15 or 25 when the cartridge is loaded in place. A film feed roller 50 is brought into frictional contact with the surface of the film at the film feeding outlet 8, 18 or 27 of the cartridge 5, 15 or 25 by the means to be described later. Indicated at 51 and 52 are guide rollers for the strip film paid off from the cartridge. The take-up reel 45 has a drive shaft 54 which is driven by the motor 48 through a belt 53, etc.

As shown in FIG. 11, the cartridge mount 41 includes a base plate 55, base body 56 fixed to the front side of the plate and cover 57 fastened to the base body 56 as by screws (although the cover is shown as separated for convenience). As seen also in FIG. 7, the mount 41 has a catridge mounting opening 58 on its left side and a film feeding opening 59 on its right side.

The drive shaft 46 is supported on a bearing 60 and driven by the belt 47 around a pulley 61. The flange 49 of the shaft is positioned on the rear side of the base body 56 and has detachably connected thereto an engaging member 62 or 63 as desired. The engaging member 62 is engageable with the connector 10 of the cartridge 5 shown in FIG. 2. The engaging member 63 is engageable in the square bore 19 of the connector of the cartridge 15 shown in FIG. 4. The engaging member 62 or 63 is movable into or out of the mount 41 through a hole 64 in the base body 56 (see FIGS. 11 and 12).

The drive shaft 46 is movable relative to its bearing 60 and pulley 61 axially thereof and integral with a driven flange 65 at its rear end. While the shaft 46 is driven by the belt 47, the shaft is slidable axially thereof by the means to be described below.

As seen in FIGS. 11 and 13, the driven flange 65 is connected by a C-shaped connecting plate 66 to the movable rod 68 of a solenoid 67 fixedly mounted on the base plate 55. The connecting plate 66, which is connected by a pin 69 to the rod 68 of the solenoid 67, moves the drive shaft 46 backward in the direction of an arrow a when the solenoid 67 is energized, permitting a hook portion 71 of a latch lever 70 to engage the pin 69. Thus the drive shaft 46 is held in its retracted position by the latch lever 70. The solenoid 67 is energized only when the shaft 46 is to be retracted.

The latch lever 70 is pivoted by a pin 72 to the base plate 55, has a rear end connected to the movable rod 74 of another solenoid 73 and is biased counterclockwise by a spring 75. A pin 76 fixed to the base plate 55 pivotably carries a lever 77 having a rear end with the pin 69 extending therethrough as at 78 and a front end with a spring 79 acting thereon to bias the drive shaft 46 in the direction of an arrow b. The solenoid 73 when energized, turns the latch lever 70 clockwise to release the shaft 46 from its retracted position and permit the shaft to advance.

With the advance of the drive shaft 46, the engaging member 62 or 63 attached to the shaft 46 advances into the cartridge mount and engages with the connector of the reel of the cartridge 5, 15 or 25 in the mount 41. The reel can therefore be driven. Since the spring 79 acts also while the drive shaft 46 is in rotation, a thrust bearing 80 is interposed between the stationary connecting plate 66 and the driven flange 65 to reduce the friction therebetween during the rotation. The retraction of the movable rod 68 is limited by a flange 81 thereon.

As seen in FIG. 12, the flange 49 of the drive shaft 46 has a connecting bore 82 concentric with the axis of rotation of the shaft, two permanent magnets 83 embedded therein and arranged on diametrically opposite sides of the bore 82, and an engaging bore 84 positioned on a radial line at right angles to a line through the magnets 83. In corresponding relation thereto, each of the engaging members 62 and 63 has a connecting pin 85 fittable in the bore 82 and a driven pin 86 engageable in the bore 84, on the rear side of the member. The engaging member 62 (63) is made of a magnetic material attractable to the magnets 83, or has embedded therein magnetic pieces attactable and opposed to the magnets 83 so that the member 62 (63) is removably connectable to the flange 49 and rotatable with the drive shaft 46.

As already known in the machine specifically designed for the cartridge 5 shown in FIG. 2, the engaging member 62 has reel attracting permanent magnets 87 and pins 88 engageable in the bores 12 in the reel for the transmission of torque to the reel.

The engaging member 63 has an engaging pin 90 with an engaging portion 89 for engaging and driving the reel as already known in the machine adapted for the cartridge 15 shown in FIG. 4.

The catridge mount 41 is provided, on both the base body 56 and the cover 57 at the opening 58, with blocks 93 and 94 having slanting surfaces 99 and 92 for guiding the cartridge 5, 15 or 25 into the mount 41. The block 94 is resiliently supported by the plate spring 95 and has on the inner side thereof a portion 96 having a sharply slanting surface for engaging the cartridge 5 or 15. On the inner side of the cover 57, i.e. of the mount 41, there is a cartridge pressing plate 98 similarly supported by a plate spring 97.

While the drive shaft 46 is held retracted by the solenoid 67 as arrested by the latch lever 70, with the engaging member 62 or 63 attached to the shaft 46, the cartridge 5, 15 or 25 fittable to the engaging member can be placed into the mount 41 in a direction perpendicular to the axis of the drive shaft 46.

When the cartridge is to be loaded into place through the opening 58, the slanting surfaces 91 and 92 guide the cartridge into the mount 41 while the blocks 94 are slightly being pushed aside against the springs 95. When the cartridge has been placed into the mount 41 as specified, the rear edge of the cartridge is released from the slanting surfaces 92, whereupon the plate springs 95 act to return the blocks 94 to the original position, causing the slanting surfaces of the engaging portions 96 to press the cartridge against the wall having the film feeding opening 59, whereby the axis of rotation of the reel is aligned properly with the axis of rotation of the drive shaft 46.

When the drive shaft 46 is subsequently released from the latch lever 70, the shaft 46 advances in the direction of the arrow b to press the engaging member 62 or 63 into engagement with the connector portion of the cartridge. At this time, the pressing plate 98 biased by the plate spring 97 bears on the opposite side of the cartridge to hold the engaging member 62 or 63 in proper engagement with the connector. To assure smooth contact of the cartridge with the pressing plate 98 when the cartridge is inserted in or withdrawn, the plate 98 has slanting faces 99 along its edges on the cartridge bearing side thereof as illustrated. Even if the pins 88 or engaging portion 89 of the engaging member 62 or 63 fails to fit into the corresponding connector bore of the cartridge upon the loading of the cartridge, the portion comes into alignment with the bore in the initial stage of rotation of the drive shaft 46 and completely engages therein under the action of the spring 79 acting on the shaft 46. The engaging portion 89 of the engaging member 63 can be formed with a slanting surface for guiding the portion 89 for engagement in the square bore of the reel, whereby the parts can be engaged completely before the start of the drive shaft 46.

In a manner reverse to the above, the cartridge is removed after the drive shaft 46 has been retracted by the solenoid 67.

Although the solenoids 67 and 73 can be energized through manual switches, limit switches or the like can be disposed at suitable locations on the mount 41 for semi-automatically energizing the solenoids. Further without using the solenoids, the drive shaft 46 and the latch lever 70 may be handled directly with hand.

Briefly, although the engaging member 62 or 63 is adapted to engage the reel connector, the cartridge 5, 15 or 25 is loadable and unloadable in a direction at right angles to the axis of the drive shaft, with the engaging member shifted in the axial direction. Thus the cartridge of any type is loadable into and unloadable from the mount 41 by the simple common procedure of advancing or retracting the engaging member without necessitating the cumbersome procedure of individually handling the engagement holding members including the pressing plate 98. The reel can be driven reliably with the cartridge prevented from slipping off.

The same is true of a reel which is used singly without being accommodated in a cartridge. Thus the cartridge mount or the pressing plate and other engagement holding members can be modified variously.

The drive shaft 46 is driven when the strip film withdrawn from the cartridge is rewound on the reel in the cartridge. While the film is being paid off from the cartridge, the drive shaft 46 rotates idly following the rotation of the reel. Accordingly the drive assembly for the drive shaft is provided at a suitable location with unillustrated means, such as an electromagnetic clutch, for interrupting power transmission.

Means will now be described for feeding the film while the mount 41 is loaded with the cartridge 5, 15 or 25.

Figure 9:
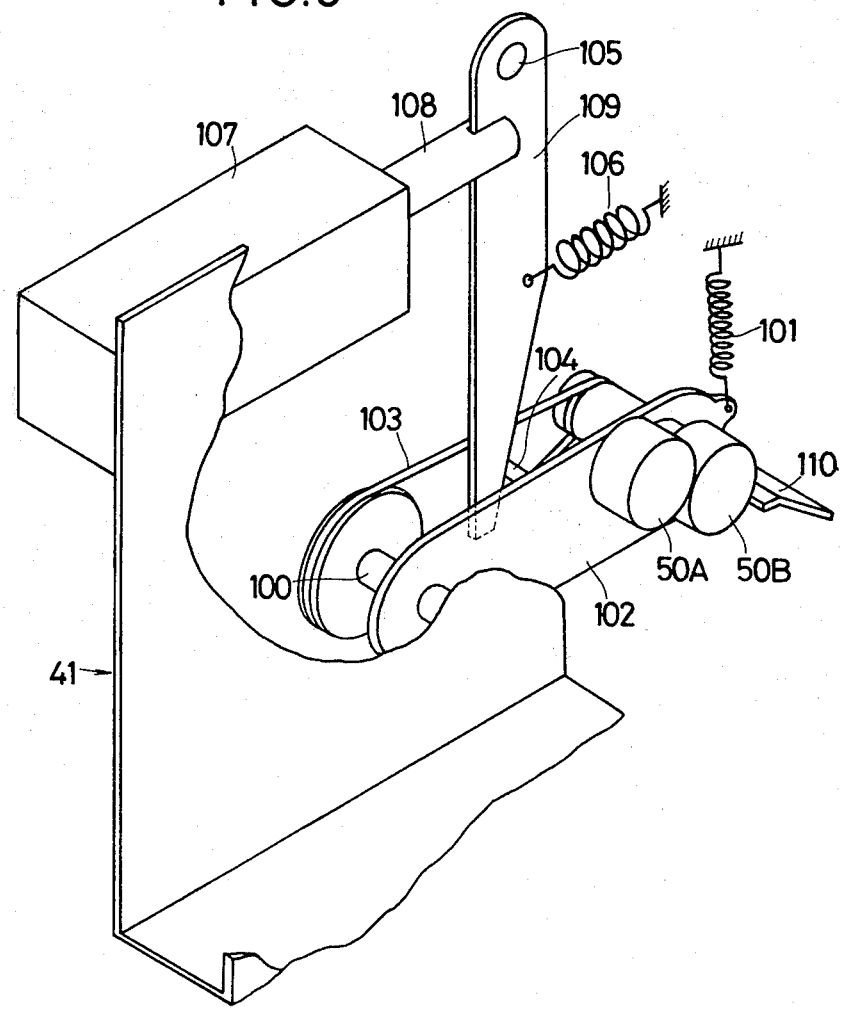
FIG. 9 is a perspective view showing a film feeding mechanism.
Figure 10:
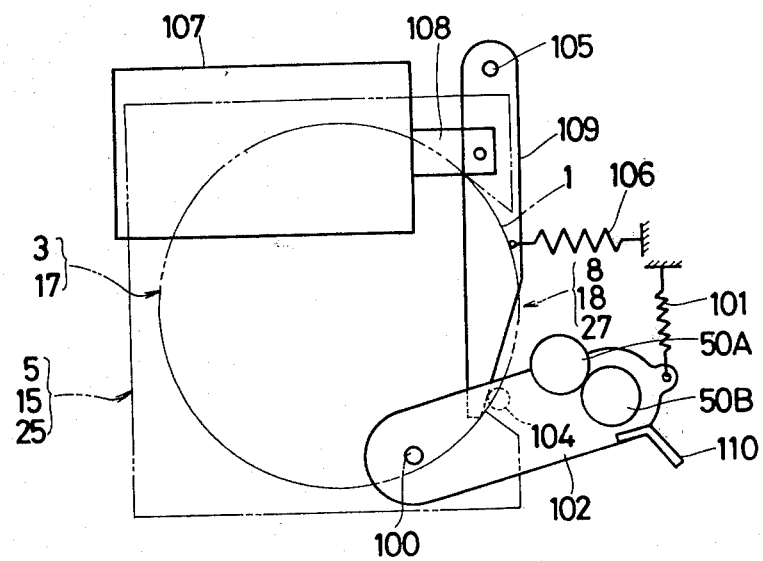
FIG. 10 is a front view of the same.

With reference to FIGS. 9 and 10, a film feeding drive shaft 100 is disposed in the rear of the mount 41. A lever 102 biased counterclockwise by a spring 101 is pivoted at its base portion to the shaft 100. A film feeding drive roller 50A is rotatably supported on the lever 102. Similarly a feed roller 50B for frictionally driving the drive roller 50A is rotatably supported on the lever 102 and is adapted to be driven by the drive shaft 100 through a belt 103. The drive roller 50A is so positioned on the lever 102 that when the lever 102 is turned counterclockwise by the operation to be described later, the drive roller 50A advances into the cartridge through the film feeding outlet 8, 18 or 27 into frictional contact with the surface of the roll film 1 wound on the reel. The drive roller 50A has a length smaller than the distance between the flanges of the reel so as to advance into the space between the flanges. As will become apparent from the following description, the drive roller 50A can be made shiftable as desired axially thereof.

The lever 102 has a pin 104 at a suitable location. An operating lever 109 is pivoted to a suitable portion of the device frame as at 105, is biased counterclockwise by a spring 106 and is connected to the movable rod 108 of a solenoid 107. The lever 109 has a lower end bearing against the pin 104 against the spring 101. While the solenoid 107 is unenergized, the spring 106 acts to hold the lever 102 in its inclined position shown, further holding the drive roller 50A away from the cartridge.

Figure 1:
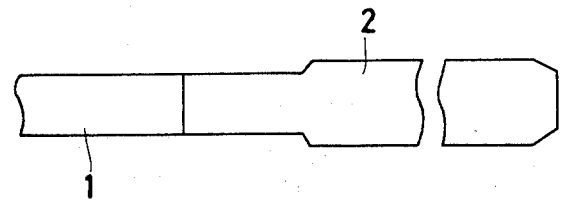
FIG. 1 is a development showing a strip film having a lead tape of larger width at its leading end.

In the case of the cartridge 5 in which the strip film has a lead tape of larger width at its leading end (see FIG. 1), the cartridge is mounted in the mount 41 as it is. In the case of the cartridge 15 in which the film has no lead tape, a lead tape having the same width as, but greater stiffness than, the film is attached to the leading end of the film, and the cartridge 15 is loaded into the mount 41. When the motor 48 is driven with the rewinding drive shaft (reel drive shaft) 46 made idly rotatable by the unillustrated electromagnetic clutch, the feeding drive shaft 100, guide rollers 51, 52 and the take-up reel drive shaft 54 can be driven. On the other hand, when the solenoid 107 is energized, the operating lever 109 is turned clockwise, releasing the pin 104 on the lever 102 to permit the spring 101 to turn the lever 102 counterclockwise. This causes the drive roller 50A to advance into the film feeding outlet 8, 18 or 27 of the cartridge 5, 15 or 25, into frictional contact with the lead tape at the leading end of the strip film wound on the reel 3 or 17.

Thus when the motor 48 is driven with the drive roller 50A in frictional contact with the surface of the rolled strip film, the roll of film 1 is driven. When the leading end of the lead tape has come to the position of the feeding outlet 8, 18 or 27 of the cartridge, the lead tape advances tangentially of the film roll by virtue of its stiffness. The film is guided by a guide plate 110 on the lever 102, guide roller 51, etc., passed between the glass plates 43, 44 at the illuminating station and further over the guide roller 52 and wound up on the take-up reel 45.

In the present embodiment, the feed roller 50B for frictionally driving the drive roller 50A rotates in the same direction as the feed of the strip film 1 delivered from the feeding outlet. Further the guide plate 110 disposed immediately after the roller 50B serves to accurately guide the leading end of the lead tape to the guide roller 51.

The drive roller 50A has a length smaller than the flange-to-flange distance of the reel 3 or 17 and is therefore dimensioned to enter the space between the flanges to frictionally contact the film approximately at the widthwise midportion thereof. Accordingly no problem will be encountered in feeding the film 1 having attached to its leading end a lead tape of the same width as the film, i.e. in the case of the cartridge 15. However if a lead tape of larger width is attached to the film and wound around the outer peripheries of the flanges of the reel 3, the drive roller 50A, when bearing on the widthwise midportion of the lead tape, is likely to warp the tape widthwise thereof while it is being wound around the reel flanges at its opposite edges, if the force of the spring 101 is too strong. When the pressure of the drive roller 50A is thus excessive, the drive roller 50A may be shifted axially thereof to nip the lead tape between the roller and the flange and frictionally drive the tape, or the drive roller 50A may be replaced by another one. Any desired shifting or replacing means is usable for this purpose.

When the take-up reel 45 starts to wind up the tape after the leading end of the lead tape has reached the reel 45, the film feeding drive roller 50A need not be driven further. At this time, therefore, the solenoid 107 is de-energized, causing the spring 106 to turn the operating lever 109 counterclockwise to retract the drive roller 50A from the roll film or the reel.

Figure 18:
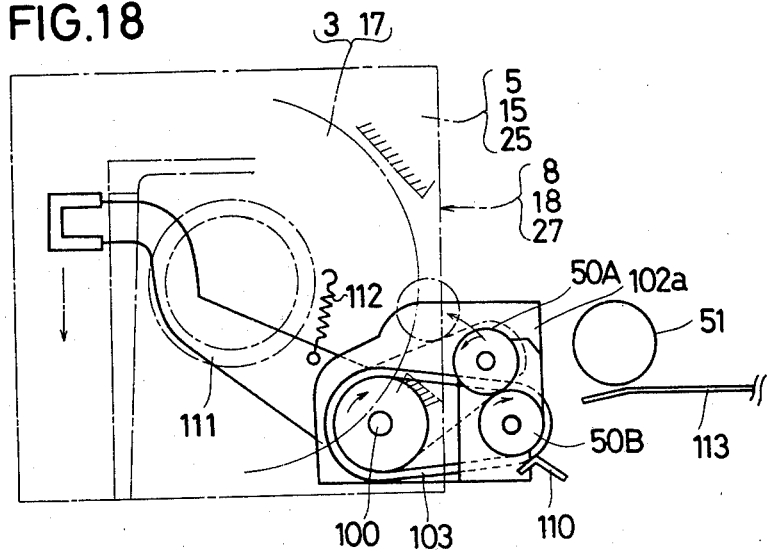
FIG. 18 is a side elevation showing another film feeding mechanism.

Although the drive roller 50A is movable into or out of the film feeding outlet by the solenoid 107 to effect or interrupt the frictional drive of the strip film as described above, the same result can be achieved by a manual operating lever 111 as seen in FIG. 18.

The operating lever 111 is pivotably supported by the drive shaft 100 and biased clockwise by a spring 112. A lever 102a for supporting the drive roller 50A, the feed roller 50B for frictionally driving the roller, the belt 103 for driving the roller 50B, the guide plate 110, etc. is similarly supported by the drive shaft 100 and is turnable with the lever 111 on the shaft 100.

When the operating lever 111 is depressed as indicated by an arrow in FIG. 18, the lever 102a turns about the shaft 100 and brings the roller 50A into frictional contact with the lead tape on the strip film through the film feeding outlet 8, 18 or 27 of the cartridge 5, 15 or 25 to drive the tape. In the same manner as above, the roller 50A advances the tape tangentially of the film roll at the outlet. The leading end of the tape is guided over the feed roller 50B, guide plate 110, guide roller 51 and guide plate 113 into the illuminating station and is further wound up on the take-up reel. After the reel starts to wind the tape leading end, the operating lever 111 is released from the depressing pressure, whereupon the spring 112 turns the levers 111 and 102a clockwise to retract the drive roller 50A from the film feeding outlet of the cartridge.

In addition to the glass plates 43 and 44, a detecting unit 120 for blip marks useful, for example, for the automatic retrieval of the desired frame of the film can be mounted at the illuminating station 42.

Figure 15:
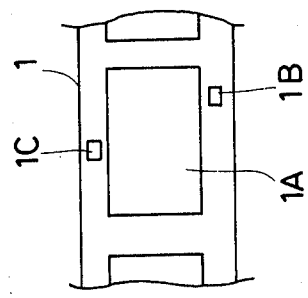
FIG. 15 shows the locations of the retrieving marks.

With reference to FIG. 15, a frame 1A of the film is provided with a blip mark 1B for counting the number of frames and with a mark 1C for obtaining other signal. It is well known that such marks are used for automatically retrieving frames of films and for controlling the position of frames. Marks such as those indicated at 1B and 1C may be merely counting marks, or those giving information, such as bar cords, relating to the frames concerned, as well known.

Figure 14:
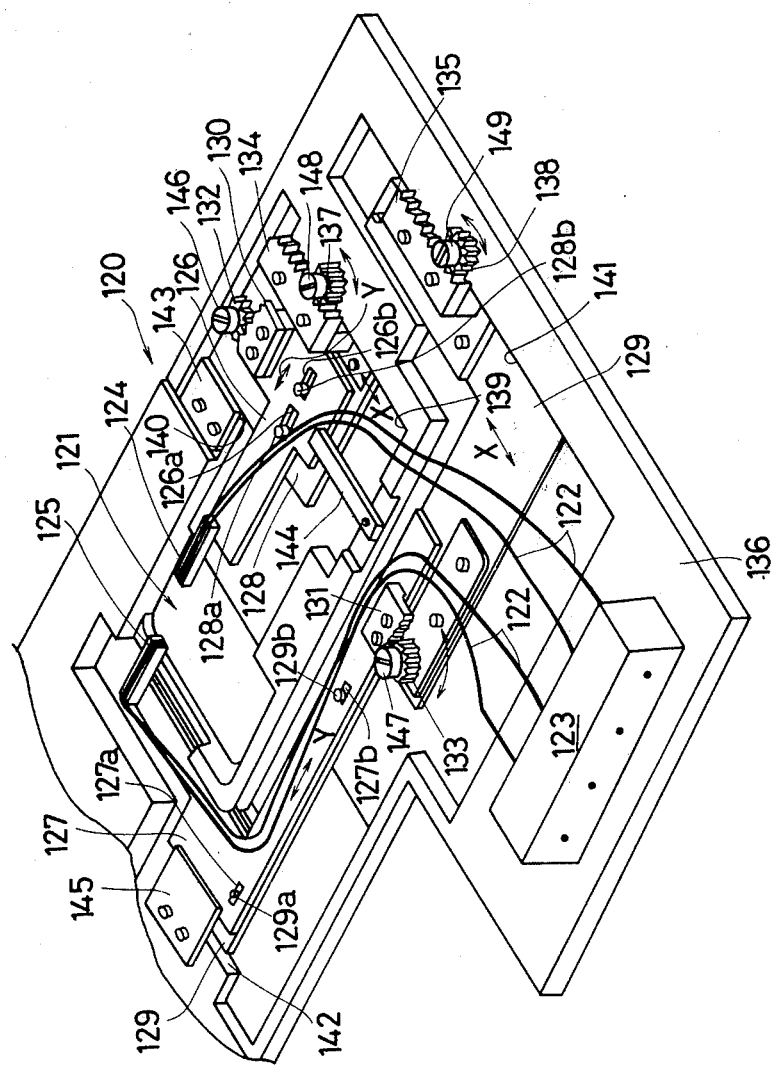
FIG. 14 is a perspective view showing means for detecting retriving marks on a strip film.

The detecting unit 120 shown in FIG. 14 is installed in the strip film handling device 40 as positioned properly so that a film illuminating opening 121 is located in the illuminating station 42 shown in FIGS. 7 and 8.

Light receiving elements for detecting marks or light transmitting elements (optical fibers) 122 for transmitting optical information to the light receiving elements are positioned at the illuminating opening 121. A photoelectric element 123 reads the marks 1B and 1C on the strip film 1 which is transported under the opening 121, in terms of variations in the amount of incident light.

The position of the marks 1B and 1C relative to the frame 1A varies with the type of the retrieval system used for the film, width of the film, etc. To accurately read the information given by the marks on any film, for example, for accurately controlling the position of the frame, the position of sensor heads 124 and 125 at the forward ends of the light transmitting elements 122 must be adjustable. Further it is desired that the position of the sensors as installed in place be finely adjustable.

However, since the sensor heads 124 and 125 are mounted close to the lens L of the illuminating system (see FIG. 7), it is extremely difficult to adjust the position of the sensor heads directly with hand, so that there arises the need to improve the unit 120 from the device every time the heads are to be adjusted. This nevertheless involves extreme inconvenience and fails to assure quick and accurate adjustment since the position of the sensors is not adjustable relative to the desired film frame to be actually projected.

According to the present invention, therefore, the detecting unit 120 is provided with an adjusting mechanism for the sensor heads 124 and 125. More specifically, the heads 124 and 125 are mounted, independently of each other, on members which are movable in X and Y directions, and operating means for adjustment are disposed away from the optical system so that the position of the heads 124 and 125 is adjustable with the detecting unit 120 mounted in the device 40.

The sensor heads 124 and 125, each holding the forward ends of two light transmitting elements 122 comprising optical fibers, are mounted fixedly on Y-direction movable plates 126 and 127 respectively so that the forward ends of the fibers 122 can receive the illuminating light at the station 42. To render the movable plates 126 and 127 slidable on X-direction movable plates 128 and 129, respectively, pins 128a, 128b and 129a, 129b on the X-direction movable plates 128 and 129 are engaged in slots 126a, 126b and 127a, 127b in the plates 126 and 127.

Racks 130, 131 fixed to the Y-direction movable plates 126, 127 are in mesh with pinion gears 132, 133 rotatably mounted on the X-direction movable plates 128, 129, respectively. Further racks 134, 135 fixed to the X-direction movable plates 128, 129 are in mesh with pinion gears 137, 138 rotatably mounted on the base plate 136 of the unit 120. As illustrated, these racks and pinion gears are located at the greatest possible distances from the illuminating system, i.e. from the opening 121.

The X-direction movable plates 128 and 129 are guided for movement by inside edges 139, 140 and 141, 142, respectively, of the unit base plate 136. Holding plates 143, 144, 145, etc. fixed to the base plate 136 are in engagement with the Y-direction movable plates 126, 127 on the X-direction movable plates 128, 129 to prevent rise of the movable plates. The Y-direction movable plates 126, 127 and the X-direction movable plates 128,129 elongated along the Y-direction so that the position adjusting means for the sensor heads 124, 125, namely operating members 146, 147, 148 and 149 for turning the pinion gears 132, 133, 137 and 138, are located away from the illuminating system as already stated. Thus the position of the sensor heads 124 and 125 is easily adjustable with the unit 120 installed in place. For the position adjustment, the operating members 146, 147, 148 and 149 are turned with a screwdriver or suitable tool to move the movable plates in the Y or X direction independently of one another, whereby the position of the detecting heads is adjustable while the unit 120 is held mounted in place, for strip films which differ in width or in the position of the retrieving mark from system to system or from maker to maker.

Since strip films differ in width from system to system or from maker to maker, conventional strip film take-up assemblies employ open reels which are removably mountable on the main body of the device, or a reel the hub and one of the reels of which are fixed to the main body, with the other flange removably attached to the hub, so that reels can be used selectively in accordance with the width of the film. Although such take-up reels are usable each singly, they are not usable alternatively as mounted on the same shaft. Whereas it has been proposed to alternatively use on the same shaft an open reel and another reel one flange of which is detachably mountable, the reels are cumbersome to interchange, and it is impossible to prepare the take-up assembly quickly for use.

The present invention provides take-up means which can be quickly and easily made ready for use with strip films of varying widths having or not having a lead tape.

Figure 16:
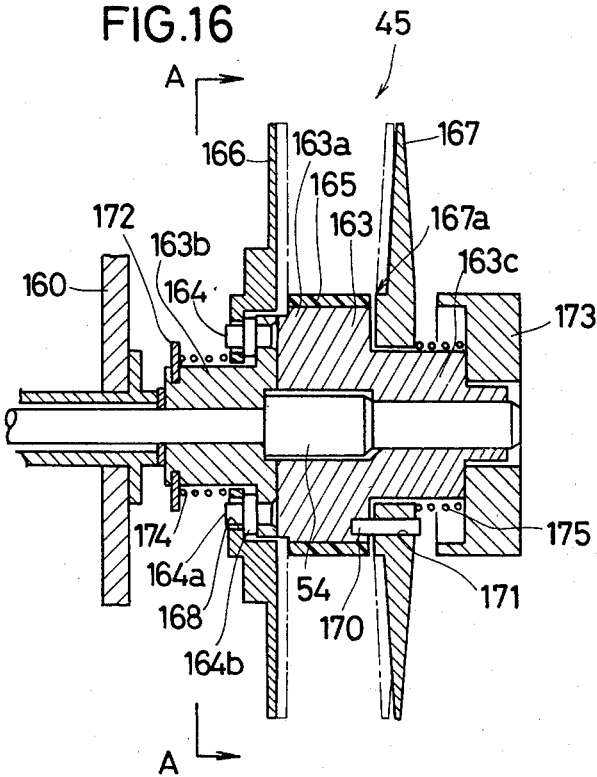
FIG. 16 is a view in vertical section showing a film take-up assembly.
Figure 17:
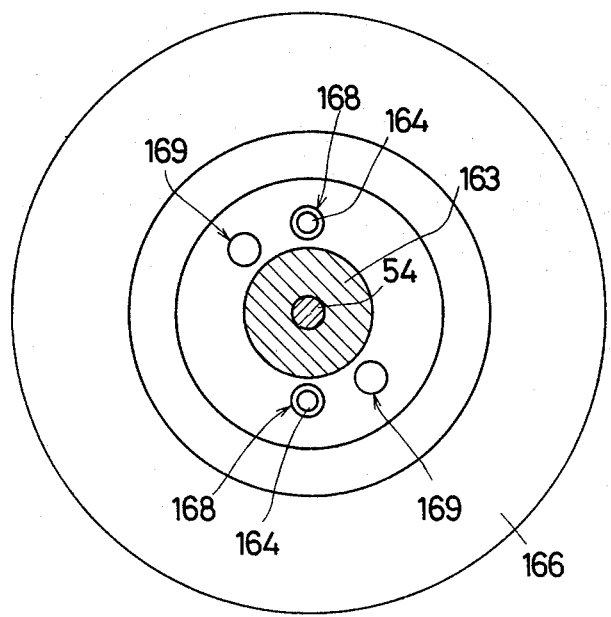
FIG. 17 is a view in cross section taken along the line A—A in FIG. 16.

With reference to FIGS. 16 and 17, the take-up reel drive shaft 54 rotatably supported on a frame 160 is driven by the motor 48 (see FIG. 8) through gear means 161, an unillustrated electromagnetic clutch, the belt 53, etc. A cylindrical take-up hub 163 fixedly mounted on the drive shaft 54 comprises a large-diameter portion 163a in the middle and small-diameter portions 163b, 163c at the opposite ends.

Two or more stepped retaining pins 164 extend from one end of the large-diameter portion 163a which end is opposed to the frame 160, while a pin 170 is implanted in the other end of the portion 163a. Each of the pins 164 has a small-diameter end portion 164a and a large-diameter base portion 164b.

The hub 163 has a friction member 165 as of rubber wound around its large-diameter portion 163a to facilitate taking up of the lead tape. Although not shown, the friction member 165 is externally provided with known means for automatically holding the leading end of the lead tape to wind the end around the friction member 165. The winding means will not be described since it is well known for example for use in film take-up means for cameras.

The small-diameter portions 163b and 163c of the hub 163 support reel flanges 166 and 167 which are movable axially of the shaft 54. The reel flange 166 is formed with small bores 168 in which the small-diameter portions 164a of the stepped pins 164 are fittable in corresponding relation thereto and which are equal in number to the number of the pins 164, and further with large bores 169 in which the large-diameter pin portions 164b are fittable correspondingly and which are equal in number to the number of the pins 164. The reel flange 167 has a bore 171 in which the pin 170 is fittable. These pins, when fitting in the corresponding bores, render the reel flanges 166 and 167 rotatable with the hub 163.

The flange 167 is formed with a stepped portion 167a and has a thickness which progressively decreases from the stepped portion 167a radially outward, whereby the flange-to-flange distance is made to increase progressively radially outward, and the axial dimension between the outer periphery of the flange 167 and the contact face thereof bearing against the end face of the large-diameter hub portion 163 is made different when the flange 167 is turned inside out.

Retaining members 172 and 173 are mounted on the outer ends of the small-diameter portions 163b and 163c, respectively. Springs 174 and 175 for biasing the flanges 166 and 167 toward the large-diameter are interposed between the retaining member 172 and the flange 166 and between the retaining member 173 and the flange 167, respectively. The retaining member 173 is removable from the small-diameter portion 163c of the hub 163 to render the flange 167 detachable.

When a lead tape or strip film of large width is to be wound on the take-up reel 45 of the foregoing construction, the small-diameter portions 164a of the retaining pins 164 are fitted in the small bores 168 of the flange 166, causing the spring 174 to press the flange 166 against the stepped portions of the pins 164, whereby the flange 166 is set in the position indicated in solid lines in FIG. 16. In this state, the lead tape sent forward by the transport means via the illuminating station 42 is fed to the space between the reel flanges 166 and 167 which are driven by the drive shaft 54. The tape is guided from the outer peripheral portion of the space toward the outer periphery of the hub 163 and wound around the large-diameter portion 163a of the hub 163 by frictional contact with the friction member 165. If the flange-to-flange distance at the radially inward portion of the flanges 166 and 167 is made slightly smaller than the width of the lead tape, the flanges 166 and 167 are slidingly moved slightly outward against the action of the springs 174 and 175 as the lead tape is wound up, permitting the tape and strip film to be wound up neatly.

When a lead tape and strip film of smaller width are to be wound up, the flange 166 is moved toward the frame 160 against the action of the spring 174 to release the small bored portions 168 from the small-diameter portions 164a of the pins 164. The flange 166 is then slightly turned on the small-diameter hub portion 163b to engage the large-diameter pin portions 164b in the large bores 169 of the flange 166, whereby the flange 166 is set in the position indicated in phantom lines in FIG. 16. With the distance between the flanges 166 and 167 thus set for the narrower lead tape and film, the take-up assembly starts to wind up the lead tape in the same manner as above.

When a lead tape and strip film of still smaller width are to be wound up, the retaining member 173, spring 175 and the flange 167 are removed from the small-diameter portion 163c of the hub 163. The reel flange 167 is then turned inside out and mounted on the small-diameter portion 163c, whereby the flange 167 is set in the position shown in phantom lines in FIG. 16, with the stepped portion 167a facing outward. This reduces the flange-to-flange distance to a greater extent for taking up the still narrower lead tape and strip film. If the axial displacements of the reel flanges 166 and 167 (the distances from the solid-line positions to the phantom-line positions) are made equal for the above setting, the center of the flange-to-flange distance can be maintained at the same position for lead tapes and strip films of different widths.

If the stepped retaining pin 164 is formed with three or more steps, the take-up reel can be adapted to wind up an increased number of strip films of different widths. Further if the retaining pin 170 for the outer reel flange 167 is in the form of a similarly stepped pin, the reel flange 167 is made shiftable like the reel flange 166.

Figure 19:
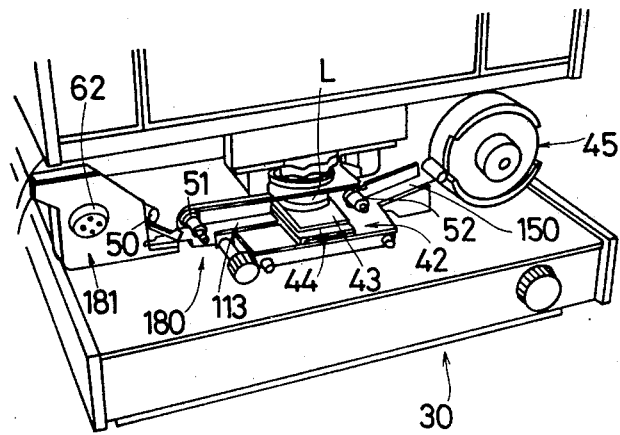
FIG. 19 is a perspective view showing another strip film handling device mounted on a microfilm reader.

As already stated, the cartridge 25 shown in FIG. 6 is known for use in Ectamate systems of Eastman Kodak Co., United States. In the case of this cartridge, the flanges of an unillustrated reel are positioned on the opposite sides of the projection 29 on the inner periphery of the cartridge 25, with the flange outer peripheries in engagement with the projection, and the flanges are rotatable along the inner surface of the cartridge. The cartridge is used as installed in the specified machine. As already described, the cartridge can be used as loaded in the box-shaped mount 41 of the device 40. However, the cartridge 25, which is made of plastics, is flexible at the back portion. If the cartridge is merely fitted, for example, in a mount 181 of a device 180 shown in FIGS. 19 and 20, the cartridge is likely to slip off during operation, e.g. during feeding or rewinding of the strip film, because of no presence of restricting means for preventing slipping of the cartridge in an axial direction. With reference to FIGS. 19 and 20, the reel has its connector attracted to the engaging member 62 in engagement therewith. In FIGS. 7, 8, 19 and 20, like parts are referred to by like reference numerals.

With the device 180, the cartridge is loaded or unloaded axially of the drive shaft 46.

To load the device 180 with the cartridge 25, the main body of the device 180 is detachably provided with a cover 182 for covering the front side of the cartridge 25 to prevent the reel from slipping off as seen in FIG. 21. On one side of the cover 182 facing the cartridge 25, positioning projections 183 and 184 are provided for retaining the cartridge 25 in position and also for preventing deformation of the cartridge 25 during operation. The cover 182 is turnably supported by a rod 185 which is detachably mounted on the device main body. The cover is biased toward the front side of the cartridge 25 by a spring 186.

The cover 182 is attached to the device 180 only when the cartridge 25 of the type described is used. The projections 183 and 184 are engageable in cavities 187 and 188 of the cartridge on the front side thereof to fix the film feeding outlet portion 27, whereby the cartridge 25 is retained in position and prevented from deformation. Accordingly the present device, into which the cartridge is loaded axially of the drive shaft 46, is also usable for cartridges of different types provided by different makers.

Since the strip film wound on the reel is a flexible roll film, there is the need to attach a stiff lead tape 2 to the leading end of the film 1 for use with the feed means described. Further some of conventional devices include a movable guide plate of metal which is integral with the lever 102 for supporting the film feed roller 50. However, the guide plate, even if in direct contact with the surface of roll film, is unable to separate the film from the roll reliably. Although it is known to use a movable guide plate and a stationary guide plate in combination therewith, the leading end of the film is liable to engage in a clearance which is invariably present between the two guide plates, creating scratches on the film. While the film advances in sliding contact with the guide plates, extraneous matter, if deposited on the plate, will impede the advance of the film and produce scratches.

To reliably separate the leading end of the film from the roll of film, there is the need to attach a stiff lead tape to the film end or to use a complex separating device.

Figure 22:
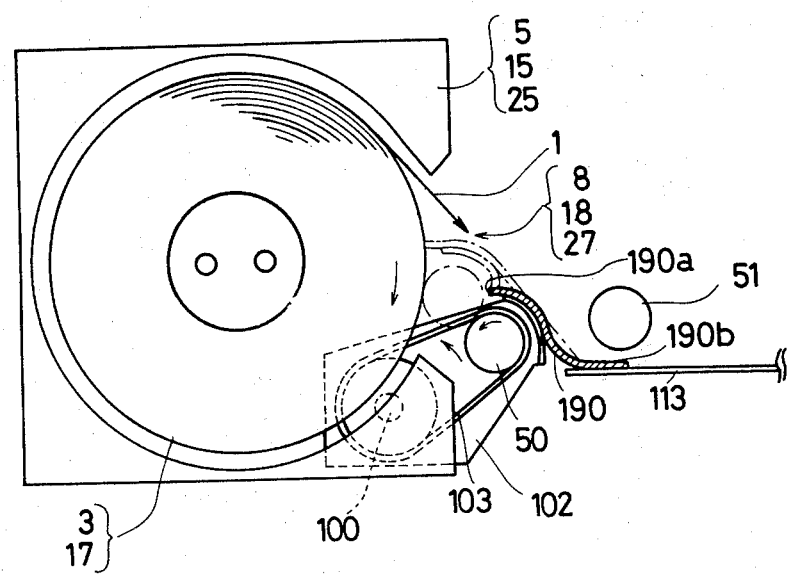
FIG. 22 is a front view showing a film feeding mechanism having a separating member.

FIG. 22 shows an embodiment which has overcome the above problems. As already stated, a film feed roller 50 advances into the cartridge 5, 15 or 25 through the film feeding outlet 8, 18 or 27 to frictionally contact the surface of a strip film wound on a reel 3 or 17 in the cartridge (see phantom lines).

A lever 102 supporting the feed roller 50 has attached to its forward end a guide member 190 made of an elastic material and shaped to extend over the upper half of the outer periphery of the roller 50. The guide member 190 is so attached to the lever 102 that when the feed roller 50 is in position for feeding the film, one end 190a of the guide member 190 is lightly in contact with the roll surface of film and the other end 190b of the guide member extends onto a guide plate 113 which constitute the transport means along with the guide roller 51.

Examples of useful materials for the elastic guide member 190 are those of the same kind as the strip film 1, such as polyester and Mylar (product of E.I. du Pont de Nemours & Co.), which have suitable flexibility and stiffness. Since plastics films generally tend to curl slightly, such material is adhered to the lever 102 with the curled inner side facing thereto. This assures that the ends of the guide member 190 will contact the surface of the film roll and the guide plate 113 properly.

When the cartridge is installed in place, the feed roller 50 and the elastic guide member 190 are so positioned as indicated in solid lines in FIG. 22. When the feed roller 50 is driven and brought into frictional contact with the surface of the film roll as indicated in phantom lines, the forward end 190a of the guide member 190 comes into contact with the roll surface. The elastic guide member 190 has such a length that in this state the other end 190b is positioned on the guide plate 113.

With the rotation of the roller 50 in frictional contact with the film roll, the reel also rotates along with the film. The leading end of the film, when reaching the elastic guide member 190, is separated from the roll by the edge of the member 190 and further guided by the member onto the guide plate 113 under the guide roller 51.

Although the surface of the strip film 1 thus delivered slides on the surface of the guide member 190, the member is made of elastic material and therefore will not deface the film. Even if there is extraneous matter adhering to the guide member 190, the member 190 will retract by virtue of its own elasticity and will not create scratches on the film.

While the feed roller 50 and the elastic guide member 190 of the present embodiment are movable together to simplify the construction, these elements may be made movable individually independently of each other. The elastic guide member can be provided fixedly if the cartridge is loadable and unloadable free of any interference.

With use of the arrangement described above, the leading end of the strip film can be separated from the film roll reliably irrespective of whether or not the film has a stiff lead tape. Additionally the device is very simple in construction.

What is claimed is:

1. In combination for use with any selected film cartridge or a plurality of film cartridges, each containing a strip film wound on a reel in the form of a roll and having similarly positioned film feed outlets through which film is withdrawn from the cartridge and at least some of the cartridges having an opening through which a feed roller is insertable at respectively different positions, a strip film handling mechanism comprising:
   drive first means directly engageable with the reel of the cartridge held loaded in a predetermined position for rotatingly driving the reel;
   feed second means for separating the leading end of the strip film from its roll and feeding the leading end from the cartridge, the feed means including a roller member movable into the film feeding outlet of the cartridge to contact the surface of the film wound on the reel;
   transparent guiding means for transporting the strip film from the feed means to a take-up station by way of an illuminating station; and
   take-up means for winding the strip film.

2. In combination for use with any selected film cartridge of a plurality of film cartridges, each containing a strip film wound on a reel in the form of a roll and having similarly positioned film feed outlets through which film is withdrawn from the cartridge and at least some of the cartridges having an opening through which a feed roller is insertable at respectively different positions, a strip film handling mechanism comprising:
   drive means engageable with the reel of the cartridge held loaded in a predetermined position for rotatingly driving the reel;
   feed means for separating the leading end of the strip film from its roll and feeding the leading end from the cartridge, the feed means including a roller member movable into the film feeding outlet of the cartridge and into frictional contact with the film survace at the widthwise midportion of the strip film wound on the reel, a support member for supporting the roller member while permitting the roller member to advance or retreat between the frictional contact position and a retracted position, an assembly for bringing the roller member to the frictional contact, and a drive transmitting assembly for rotatingly driving the roller;
   transparent guiding means for transporting the strip film from the feed means to a take-up station by way of an illuminating station; and
   take-up means for winding up the strip film.

3. In combination for use with any selected film cartridge of a plurality of film cartridges, each containing a strip film wound on a reel in the form of a roll and having similarly positioned film feed outlets through which film is withdrawn from the cartridge and at least some of the cartridges having an opening through which a feed roller is insertable at respectively different positions, a strip film handling mechanism comprising:

drive means engageable with the reel of the cartridge held loaded in a predetermined position for rotatingly driving the reel, said drive means including interchangeable engaging members for engaging the drive means with the reel;

feed means for separating the leading end of the strip film from its roll and feeding the leading end from the cartridge, the feed means including a roller member movable into the film feeding outlet of the cartridge to contact the surface of the film wound on the reel;

a support member for supporting the roller member while permitting the roller member to advance or retreat between the frictional contact position and a retracted position, an assembly for bringing the roller member to the frictional contact, and a drive transmitting assembly for rotatingly driving the roller;

transparent guiding means for transporting the strip film from the feed means to a take-up station by way of an illuminating station; and take-up means for winding up the strip film.

4. A strip film handling device for using a strip film contained in a cartridge and wound on a reel in the form of a roll by withdrawing the film from the cartridge through a film feeding outlet thereof, comprising:

means for rotatingly driving the reel of a cartridge held loaded in a specified position, the means incuding an axially movable rotatable driving shaft for delivering a drive force from a drive source and an engaging member attached to the drive shaft,, the engaging member being movable into or out of a cartridge mount to render the cartridge insertible into or removable from the mount at right angles to the axis of the reel driving means, means for separating the leading end of the strip film from the roll on the reel and feeding the same, transport guiding means for transporting the strip film from the feeding means to a take-up station by way of an illuminating station, and take-up means for winding up the strip film thereon.

5. A device as defined in claim 4 wherein the driving means further comprises a member for moving the drive shaft to a retracted position, a member for moving the drive shaft to a retracted position, a member for biasing the drive shaft toward an engaging position, a member for holding the drive shaft in the retracted position and a member for releasing the drive shaft from the retracted position.

6. A strip film handling device for using a strip film contained in a cartridge and wound on a reel in the form of a roll by withdrawing the film from the cartridge through a film feeding outlet thereof, comprising:

drive means engageable with the reel of the cartridge held loaded in a specified position for rotatingly driving the reel, means for separating the leading end of the strip film from the roll on the reel and feeding the same, transport guiding means for transporting the strip film into the feed means to a take-up station by way of an illuminating station, and take-up for winding up the strip film, the take-up means including two reel flanges spaced apart by a variable distance and one of said flanges having a mechanism for varying said distance whereby the strip film handling device is usable for strip films of different widths, said take-up means comprising a hub having a plurality of stepped pins implanted in at least one of its ends for winding up the strip film, a reel flange having groups of bores corresponding in diameter to diameters of the stepped portions of the stepped pins, the boxes in each of the groups being equal in number to the number of the stepped pins, and a spring member for biasing the reel flange toward the hub and having the stepped pins, and the reel flange is shiftable against the spring member out of engagement with some of the stepped portions of the stepped pins, then turnable and engageable with other diametrically different stepped portions to vary the flange-to-flange distance.

7. A device as defined in claim 6 wherein the at least one reel flange detachably fittable to one end of the hub reversibly on the front side and the rear side of the flange, the axial dimension between the outer periphery of the flange and the surface thereof in contact with the hub end on the flange front side being different from the corresponding dimension on the flange rear side, and a member for holding the reel flange to the hub end, the front side and the rear side of the reel flange being usable as a take-up flange surface to vary the flange-to-flange distance.

8. A strip film handling device for using a strip film contained in a cartridge and wound on a reel in the form of a roll by withdrawing the film from the cartridge through a film feeding outlet thereof, comprising:

drive means engageable with the reel of the cartridge held loaded in a specified position for rotatingly driving the reel, means for separating the leading end of the strip film from the roll on the reel and feeding the same, transport guiding means for transporting the strip film from the feed means to a take-up station by way of an illuminating station, detecting means for detecting marks on the strip film when the film passes the illuminating station, the detecting means including a base plate having an opening corresponding to the illuminating station, a detecting member disposed in the vicinity of the opening for detecting the marks on the film, movable members supporting the detecting member and movable relative to the base plate in the direction of advance of the strip film and in a direction at right angles to the direction, and adjusting members for moving the movable members to adjust the detecting member to a proper position in accordance with the location of the marks on the strip film in use, and take-up means for winding up the strip film.

9. A device as defined in claim 8 wherein the detecting member comprises an optical fiber for guiding light from the opening to a photoelectric element.

10. A device as defined in claim 8 wherein the movable members extend to a position away from the opening, and the adjusting members are disposed at a location away from the opening.

11. A strip film handling device for using a strip film contained in a cartridge and wound on a reel in the form of a roll by withdrawing the film from the cartridge through a film feeding outlet thereof, comprising:

drive means engageable with the reel of the cartridge held loaded in a specified position for rotatingly driving the reel, means for separating the leading end of the strip film from the roll on the reel and feeding the same, transport guiding means for transporting the strip film from the feed means to a take-up station by way of an illuminating station, and, and take-up means for winding up the strip film, the take-up means including two reel flanges spaced apart by a variable distance and one of said flanges having a mechanism for varying said distance whereby the strip film handling device is usable for strip film of different widths, said take-up means comprising a hub for winding up the strip film, at least one reel flange detachably fittable to one end of the hub reversibly on the front side and the rear side of the flange, the axial dimension between the outer periphery of the flange and the surface thereof in contact with the hub end on the flange front side being different from the corresponding dimension on the flange rear side, and a member for holding the reel flange to the hub end, the front side and the rear side of the reel flange being usable as a take-up flange surface to vary the flange-to-flange distance.

12. A strip film handling device for using a strip film contained in a cartridge and wound on a reel in the form of a roll by withdrawing the film from the cartridge through a film feeding outlet thereof, comprising:

drive means engageable with the reel of the cartridge held loaded in a specified position for rotatingly driving the reel, means for separating the leading end of the strip film from the roll on the reel and feeding the same, transport guiding means for transporting the strip film from the feed means to a take-up station by way of an illuminating station, and take-up means for winding up the strip film, the take-up means including two reel flanges spaced apart by a variable distance, whereby the strip film handling device is made usable for strip films of different widths, said take-up means having a plurality of stepped pins implanted in its one end for winding up the strip film, a first reel flange having groups of bores corresponding in diameter to the diameters of the stepped portions of the stepped pins, the bores in each of the groups being equal in number to the number of the stepped pins, a spring member for biasing the first reel flange toward the hub end having the stepped pins, a second reel flange detachably fittable to the other end of the hubs, the axial dimension between the outer periphery of the second flange and the surface thereof in contact with the other hub on the front side of the second flange being different from the corresponding dimension on the rear side thereof, and a member for detachably holding the second flange to the other hub end, the first reel flange being shiftable against the spring member out of engagement with some of the stepped portions of the stepped pins, then turnable and engageable with other diametrically different stepped portions, the second reel flange being reversible to use the front side or rear side thereof, whereby the flange-to-flange distance is variable as desired, the flange-to-flange distance being optimally settable by shifting the two reel flanges at the same time.

13. A strip film handling device for using a strip film contained in a cartridge and wound on a reel in the form of a roll by withdrawing the film from the cartridge through a film feeding outlet thereof, comprising:

drive means engageable with the reel of the cartridge held loaded in a specified position for rotatingly driving the reel, feed means including a roller member movable into a film feeding outlet of the cartridge for rotating the roll of the film on the reel by frictional contact with the surface of the film, and a member for separating the leading end of the film from the roll and feeding the film, transport guiding means for transporting the strip film from the feed means to a take-up station by way of an illuminating station, said separating member being made of an elastic material having greater stiffness than the strip film and having a rear end extending into a guide plate of the transport guiding means, and take-up means for winding up the strip film, said feed means including the roller member, the roller member being movable into frictional contact with the film surface at the widthwise midportion of the strip wound on the reel, a support member for supporting the roller member while permitting the roller member to advance or retract between the frictional contact position and a retracted position; the separating member, the separating member being attached to the support member to contact the surface of the film roll when the roller member is in the frictional contact position, an assembly for bringing the support member to the frictional contact position for the roller, and a drive transmitting assemby for rotatingly driving the roller member.

14. A device as defined in claim 13 wherein the drive means includes interchangeable engaging members for engaging the drive means with the reel, said reel having an engaging portion differently shaped in accordance with the respective cartridge.

15. A strip film handling device for using a strip film contained in a cartridge and wound on a reel in the form of a roll by withdrawing the film from the cartridge through a film feeding outlet thereof, comprising:

drive means engageable with the reel of the cartridge held loaded in a specified position for rotatingly driving the reel, feed means for separating the leading end of the strip film from its roll and feeding the load end from the cartridge, the feed means including a roller member movable into the film feeding outlet of the cartridge to contact the surface of the film wound on the reel, the roller member being movable into frictional contact with the film surface at the widthwise midportion of the strip film wound on the reel, a support member for supporting the roller member while permitting the roller member to advance or retract between the frictional contact position and a retracted position, an operating assembly for bringing the roller member to the frictional contact position, and a drive transmitting assembly for rotatingly driving the roller member, transport guiding means for transporting the strip film from the feed means to a take-up station by way of an illuminating station; and take-up means for winding up the strip film, the take-up means including two reel flanges spaced apart by a variable distance, whereby the device is made usable for strip films of different widths contained in cartridges of the type having a lead portion at the leading end of the strip film and also of the type having no lead portion.

16. A device as defined in claim 15 wherein the operating assembly includes a solenoid for advancing or retracting the support member.

17. A device as defined in claim 15 wherein the operating assembly includes a member for manually operating the support member.

18. A device as defined in claim 15 wherein the drive means includes at least two interchangeable engaging members for engaging the drive means with the reel.

19. A device as defined in claim 15 wherein the take-up means comprises a hub having a plurality of stepped pins implanted in at least one of its ends for winding up the strip film, a reel flange having groups of bores corresponding in diameter to the diameters of the stepped portions of the stepped pins, the bores in each of the groups being equal in number to the number of the stepped pins, and a spring member for biasing the reel flange toward the hub end having the stepped pins.

20. A device as defined in claim 15 wherein the take-up means comprises a hub for winding up the strip film, at least one reel flange detachably fittable to one end of the hub reversibly on the front side and the rear side of the flange, the axial dimension between the outer periphery of the flange and the surface thereof in contact with the hub end on the flange front side being different from the corresponding dimension on the flange rear side, and a member for holding the reel flange to the hub end.

21. A device as defined in claim 15 wherein the take-up means comprises a hub having a plurality of stepped pins implanted in its one end for winding up the strip film, a first reel flange having groups of bores corresponding in diameter to the diameters of the stepped portions of the stepped pins, the bores in each of the groups being equal in number to the number of the stepped pins, a spring member for biasing the first reel flange toward the hub end having the stepped pins, a second reel flange detachably fittable to the other end of the hub, the axial dimension between the outer periphery of the second flange and the surface thereof in contact with the other hub on the front side of the second flange being different from the corresponding dimension on the rear side thereof, and a member for detachably holding the second flange to the other hub end.

22. A strip film handling device for using a strip film contained in a cartridge and wound on a reel in the form of a roll by withdrawing the film from the cartridge through a film feeding outlet thereof, comprising:
   drive means engageable with the reel of the cartridge held loaded in a specified position for rotatingly driving the reel,
   feed means including a roller member movable into a film feeding outlet of the cartridge for rotating the roll of the film on the reel by frictional contact with the surface of the film, and a member for separating the leading end of the film from the roll and feeding the film,
   transport guiding means for transporting the strip film from the feed means to a take-up station by way of an illuminating station, and
   take-up means for winding up the strip film, the take-up means including two reel flanges spaced apart by a variable distance.

23. A device as defined in claim 22 wherein the feed means comprises the separating member, and the separating member is attached to a support member for supporting the roller member forwardly or backwardly movably to contact the surface of the film roll when the roller member is positioned in frictional contact with the film surface.

24. A device as defined in claim 23 wherein the separating member is made of an elastic material having greater stiffness than the strip film and has a rear end extending onto a guide plate of the transport guiding means.

* * * * *